(12) United States Patent
Edwards et al.

(10) Patent No.: US 8,077,142 B2
(45) Date of Patent: Dec. 13, 2011

(54) REFLECTIVE, BI-STABLE MAGNETO OPTICAL DISPLAY ARCHITECTURES

(75) Inventors: Charles O. Edwards, Rio Rancho, NM (US); James Caruso, Albuquerque, NM (US)

(73) Assignee: Tred Displays Corporation, Rio Rancho, NM (US)

( * ) Notice: Subject to any disclaimer, the term of this patent is extended or adjusted under 35 U.S.C. 154(b) by 1044 days.

(21) Appl. No.: 11/860,198

(22) Filed: Sep. 24, 2007

(65) Prior Publication Data

US 2008/0074365 A1    Mar. 27, 2008

Related U.S. Application Data

(60) Provisional application No. 60/847,601, filed on Sep. 27, 2006, provisional application No. 60/847,603, filed on Sep. 27, 2006, provisional application No. 60/875,514, filed on Dec. 18, 2006.

(51) Int. Cl.
*G09G 3/34* (2006.01)

(52) U.S. Cl. ......... 345/111; 359/296; 359/298; 345/107

(58) Field of Classification Search .................... 345/86, 345/107, 111, 173; 359/290, 295, 296, 298; 427/214, 282; 347/172
See application file for complete search history.

(56) References Cited

U.S. PATENT DOCUMENTS

| | | |
|---|---|---|
| 1,191,023 A | 7/1916 | Naylor |
| 2,667,542 A | 1/1954 | Wright |
| 2,708,722 A | 5/1955 | Wang |
| 2,736,880 A | 2/1956 | Forrester |
| 3,140,553 A | 7/1964 | Taylor |
| 3,161,861 A | 12/1964 | Olsen et al. |
| 3,581,301 A | 5/1971 | Stutz |
| 3,936,818 A | 2/1976 | Skrobisch |
| 4,074,253 A | 2/1978 | Nadir |
| 4,161,037 A | 7/1979 | Seleznev et al. |
| 4,464,752 A | 8/1984 | Schroeder et al. |
| 4,577,427 A | 3/1986 | Browne |
| 4,769,638 A | 9/1988 | Woolfolk |
| 4,806,863 A | 2/1989 | White |
| 4,811,008 A | 3/1989 | Woolfolk |
| 4,831,372 A | 5/1989 | Riddoch |
| 4,932,147 A | 6/1990 | David |
| 5,005,305 A | 4/1991 | Turney et al. |
| 5,515,075 A | 5/1996 | Nakagiri et al. |
| 5,596,447 A | 1/1997 | Onodera |

(Continued)

FOREIGN PATENT DOCUMENTS

JP    05188872    7/1993

(Continued)

*Primary Examiner* — Lun-Yi Lao
*Assistant Examiner* — Shaheda Abdin
(74) *Attorney, Agent, or Firm* — Deborah A. Peacock; Philip D. Askenazy; Peacock Myers, P.C.

(57) ABSTRACT

Reflective, low-cost display pixels and displays incorporating magneto-optical elements wherein an externally applied magnetic field is perpendicular to an axis of rotation of the magneto-optical elements and parallel to a viewing plane of a display made from these elements. The display elements have a restricted rotation about their long axis which can be actuated by an external magnetic field to produce a bistable, electronically writable image. In addition, architectural modifications to this arrangement can be made such that the power required to write the image to such a display is decreased, overall display efficiency is increased and crosstalk between pixels is nearly eliminated.

19 Claims, 4 Drawing Sheets

U.S. PATENT DOCUMENTS

| | | |
|---|---|---|
| 5,809,675 A | 9/1998 | Tijanic et al. |
| 5,904,790 A | 5/1999 | Sheridon |
| 6,045,888 A | 4/2000 | Chen et al. |
| 6,094,293 A * | 7/2000 | Yokoyama et al. ........... 359/280 |
| 6,147,791 A | 11/2000 | Sheridon |
| 6,510,632 B1 | 1/2003 | Weinacht et al. |
| 6,542,283 B1 * | 4/2003 | Sheridon ....................... 359/296 |
| 6,603,458 B1 | 8/2003 | Fischer et al. |
| 6,864,865 B2 * | 3/2005 | Maeda ............................ 345/55 |
| 6,897,848 B2 | 5/2005 | Sheridon |
| 6,970,155 B2 | 11/2005 | Cabrera |
| 7,206,119 B2 | 4/2007 | Honeyman et al. |
| 7,304,787 B2 | 12/2007 | Whitesides et al. |
| 7,394,509 B2 | 7/2008 | Sage |
| 7,843,626 B2 | 11/2010 | Amundson et al. |
| 2002/0015831 A1 | 2/2002 | Sheridon et al. |
| 2002/0097199 A1 | 7/2002 | Matsuura et al. |
| 2002/0131151 A1* | 9/2002 | Engler et al. ................. 359/296 |
| 2004/0150614 A1* | 8/2004 | Seo ................................ 345/111 |
| 2004/0164950 A1 | 8/2004 | Cabrera |
| 2004/0262614 A1 | 12/2004 | Hack et al. |
| 2006/0029250 A1 | 2/2006 | Karaki |
| 2006/0038772 A1 | 2/2006 | Amundson et al. |
| 2006/0044482 A1 | 3/2006 | Shaftel |
| 2006/0125363 A1 | 6/2006 | Tahira et al. |
| 2006/0132430 A1 | 6/2006 | Ricks et al. |
| 2006/0152475 A1 | 7/2006 | Zhou et al. |
| 2006/0176438 A1 | 8/2006 | Sage |
| 2007/0057908 A1 | 3/2007 | Jacobson |
| 2007/0200795 A1 | 8/2007 | Whitesides et al. |
| 2007/0200819 A1 | 8/2007 | Song |
| 2008/0074365 A1 | 3/2008 | Edwards et al. |
| 2008/0278472 A1 | 11/2008 | Huitema et al. |
| 2009/0174651 A1 | 7/2009 | Jacobson et al. |
| 2010/0265239 A1 | 10/2010 | Amundson et al. |

FOREIGN PATENT DOCUMENTS

| | | |
|---|---|---|
| JP | 07248731 | 9/1995 |
| JP | 08197891 | 6/1996 |
| JP | 2001222031 | 8/2001 |
| JP | 2002006346 | 1/2002 |
| JP | 2002366102 | 12/2002 |
| JP | 2006-520488 A | 9/2006 |
| JP | 2006520488 | 9/2006 |
| WO | WO-2008039954 | 4/2008 |
| WO | WO-2008039955 | 4/2008 |

* cited by examiner

REFLECTIVE, BI-STABLE MAGNETO OPTICAL DISPLAY ARCHITECTURES

CROSS-REFERENCE TO RELATED APPLICATIONS

This application claims the benefit of and priority to U.S. Provisional Application No. 60/847,601, filed Sep. 27, 2006, U.S. Provisional Application No. 60/847,603, filed Sep. 27, 2006 and U.S. Provisional Application No. 60/875,514, filed Dec. 18, 2006, all of which are incorporated herein by reference in their entirety.

BACKGROUND OF THE INVENTION

1. The Field of the Invention

Embodiments of the present invention relate to display and pixel architectures suitable for the manufacture of bi-stable, reflective, magneto optical displays. These displays are suitable for a multitude of applications, especially cost-sensitive, large-format outdoor signage applications. These new display architectures have ultra-low power consumption, are light weight, thin and leverage existing low cost industrial manufacturing processes.

2. The Relevant Technology

The principles of the present invention relate to a new type of reflective, bi-stable, magneto optical display especially well suited for large format, outdoor and high brightness applications. The core components of this invention can be manufactured using low cost, industrial manufacturing processes.

Traditional flat panel display technologies like plasma, liquid crystal and organic light emitting diode displays have proven unsuccessful for use in large format signage applications. These display technologies do not offer sufficient brightness and contrast when exposed to direct sunlight, where ambient light can reach 100,000 lux, or other high brightness environments where ambient light is greater then 1,000 lux. In addition they are not cost effective or reliable when put in large format, outdoor environments.

Today, large panel arrays of discrete light emitting diodes (LEDs) have been developed to fill the need of the digital signage market. These indoor and outdoor digital signage devices are very expensive products with a high number of discrete components and high power requirements. They must use a high number of densely packed high-brightness LEDs to emit enough light to compete directly with sunlight in outdoor and high brightness applications. Direct sunlight can be up to 100,000 lux. A simple one color, 4 line×20 character LED display will typically use approximately 2,800 discrete LEDs. An LED "Jumbotron" large format, color video screen may require greater than 1 million discrete components.

Another feature the sign industry is looking for is reflective technology in place of light emitting. With reflective displays, direct sunlight is used during the day for illumination. At night, illumination requirements are far lower so the power used by a reflective display even with night lighting will be much lower. Another benefit is bi-stability. This is a display that maintains the image without continuous power once the image is written to the display. This enables very low power consumption in applications such as information displays and signage. This is because many signs will not require information to be changed frequently. For example, a gas price sign may only be updated once a day or a clock only changes one digit every 60 seconds. Bi-stable displays can be ultra-low power making it possible for them to be powered by small batteries or solar cells. This may eliminate the need for costly wiring especially where the sign may not be near utilities. Finally, light weight and thin digital signs are desirable because they reduce the cost of installation and the support structure required. The invention described herein has all of these features: reflective, bistable, low power, thin and light weight.

Prior to LED signs, starting in the early 1900s, there were various electronic signage technologies that used electromagnetic actuators (Naylor U.S. Pat. No. 1,191,023, Taylor U.S. Pat. No. 3,140,553 and Browne U.S. Pat. No. 4,577,427). These discrete actuators were generally variations of small electromagnetic coils or motors with a reflective mechanical flap apparatus. They were broadly used and a small number of these device are still in use today for specific outdoor signage applications like score boards and transit signs. However, they have become obsolete with the advent of LEDs because they are very expensive to construct, suffer from reliability issues and are limited in resolution due to the size of the discrete mechanical assemblies needed for each pixel.

Development continued in the use of magnetic actuators for displays by Weiacht (U.S. Pat. No. 6,510,632) where magnets were attached to large flaps or "flags" that could be rotated 180 degrees in forming a signage character. This type of technology was continued with the patents of Fischer et al and others (U.S. Pat. Nos. 3,936,818, 6,603,458) that again discussed the use of magnetically driven flaps as individual display pixels. These devices are mounted on a mechanical axis and only one magneto-optic "flag" is used in each individual device.

While magnetics itself and the study of magnetic materials is an old discipline that dates back centuries and is still studied heavily today (see Spaldin, N., Magnetic Materials Fundamentals and Device Applications, Cambridge Univ. Press, 2003.; Kittel, C. Introduction to Solid State Physics, Wiley, 1996.), few attempts have been made in recent years to develop a new type of reflective magnetic-based display technology. In 1898 and 1928 Poulsen and Pfleumer, respectively, leveraging magnetic phenomena, developed the use of magnetics in recording media. In the 1960's magnetic materials were used to store memory, first by Forrester et al and others (U.S. Pat. Nos. 2,736,880, 2,667,542, 2,708,722). Magnetic core memory, pioneered by Olsen and others (U.S. Pat. Nos. 3,161,861, 4,161,037, 4,464,752) has seen significant attention for decades due to its implications on the computing industry but for a number of reasons was replaced by silicon-based memory devices.

The primary work in the use of magnetics in displays outside of the older "flap" technologies utilizes bi-colored magnetic particles instead of mechanical flaps. Here, the use of smaller discrete magnetic spheres has been envisioned as a display design by Magnavox (Lee, L. IEEE Transactions on Electron Devices, ED-22, P758) and more recently by Katsuragawa et al. (Japan Patent Publication 2002-006346) and to a lesser extent by Masatori (Japan Patent Publication 08-197891). This prior art deals primarily with the use of small magnetic particles which respond to external magnetic fields by rotating. The rotation of these magnetic particles is in response to an external field that is required to prevent the particles from returning to a lower potential energy state. These magnetic spheres are magnetized along the center axis. The north and south poles of the spheres are coated with different colors. A magnetic field is then applied that rotates the particles between the two color states. This method of making an electromagnetic display has several problems which will now be discussed.

A first problem is an external magnetic field needs to be sustained. Without an ongoing electromagnetic field, the particles will align to each other in a low energy, grey state. Two methods to sustain the magnetic field are: 1) Use constant current to the electromagnetic coil—the issue here is constant power consumption and it requires much higher cost control electronics. 2) Add a layer of ferrite/"writable" magnetic material. This layer must sustain a sufficient magnetic field after it has been "written" by an electromagnetic write pulse. One issue here is that the added layer is a complex magnetic material that needs to be developed. Also the strength of the magnetic field and stability of the "writable" magnetic state is complex. There is significant added cost of manufacturing with this more complex structure. Finally, the energy required to create a sufficient B magnetic field inside the material to "write" a sustainable magnetic state can be considerable.

A second problem is crosstalk between pixels. The flux patterns created by two pixels of different states will create curved flux lines between their poles. The transition from one pixel's color state (North) to the second pixel's color state (South) will create flux patterns that are displayed as artifacts between pixels that will be viewed as a "grey" zone. Creating distinct separation between pixels without crosstalk is a major problem. Another form of crosstalk can occur when the magnetic field of one pixel "overpowers" a neighboring pixel and reverse its state during the write process.

A third problem is low contrast. Spherical particles, if placed in a single layer, will have limited contrast because they do not have full coverage of the display plane. If multiple layers of magnetic spheres are used, this increases their interference with each other, making it more difficult to control their states and thus requiring a stronger external magnetic field.

A fourth problem is magnetic materials. Development of new materials of construction and methods of fabrication are needed. The materials and methods must create low cost, light weight, environmentally stable, permanent magneto optical elements with accurate alignment of the magnetic field to the color planes.

A fifth problem is resolution limitations. This is because the domains of permanent magnetic particles lose stability when they are isolated or particles are made too small (for example, below 100 microns a drop in stability in magnetic particles starts to be observed depending on the specific material). In addition, electromagnetic coil assemblies become less efficient when the size is below 1 mm due to heat losses in the wire windings from the increased resistance of the smaller conductors. Also, in order for low cost, industrial manufacturing processes to replace high cost "clean room" processes, the manufacturing tolerances need to be in the range of +/−25 microns or larger to enable ease of manufacturing.

A sixth problem is design of a low cost electronic backplane. The highest cost processes in flat panel displays is the manufacturing of active matrix backplane layers that control the display. Most liquid crystal (LCD), organic light emitting diode (OLED) and even the latest electronic-paper (ePaper) displays utilize an array of thin film transistors (TFTs) that are manufactured over the entire back of the display to control the image. The cost of this backplane can equal 50% of the entire process costs of the display panel. A low cost backplane alternative is needed for large format signage applications.

The principles of the present invention discussed herein disclosure a significantly different architecture for producing a particle-based electromagnetic flat panel display. It is a new approach designed primarily for, although not limited to, large format and/or lower resolution applications (with pixel sizes of 1 millimeter or greater). This invention utilizes magnetics and electromagnetics to solve the problems described above.

BRIEF SUMMARY

A first embodiment disclosed herein relates to a magnetic display element. The magnetic display element includes a first optical portion having a first color and a second optical portion having a second color. The first and second optical portions bisect along an axis of color separation. The magnetic display element is magnetized such that a North-South magnetization axis of the display element is parallel to and bisects the axis of color separation.

A second embodiment of the present invention disclosed herein relates to a display device configured to display one or more Magneto-Optical Elements (MOEs). The display device includes a front plane configured to include one or more MOEs. The one or more MOEs comprise a first optical portion having a first color and a second optical portion having a second color. The first and second optical portions bisect along an axis of color separation. The magnetic display element is magnetized such that a North-South magnetization axis of the display element is parallel to and bisects the axis of color separation. The display device also includes a back-plane coupled to the front plane and configured to provide an external magnetic field to the one or more MOEs such that the one or MOEs may rotate about the axis the of color separation.

A third embodiment of the present invention disclosed herein relates to a display device configured to display one or more Magneto-Optical Elements (MOEs). The display device includes a first MOE having a first magnetic field strength and being configured in a first orientation and a first plurality of MOEs having a second magnetic field strength that is less than the first magnetic field strength and being configured in the first orientation. The plurality of MOEs includes at least two MOEs placed on opposite sides of the first MOE. The first MOE rotates to a second orientation in response to an external magnetic field. The first plurality of MOEs automatically rotate to the second orientation in response to the rotation of the first MOE.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments of the present invention are directed to display pixel architectures and resulting display architectures. These pixel and display architectures utilize novel magnetic near cylindrical shaped elements which also contain optical components. These particles are herein referred to as magneto-optical elements or MOEs. These MOEs are novel in that they are magnetized in an equatorial direction such that the North-South pole axis bisects their two different optical layers or portions. Various shapes of MOEs are envisioned, but one of the simplest configurations is cylindrical. This is because the shape of the MOE(s) and the cavity it is put into should have the following functions: (1) The MOE(s) inside the cavity should be able to rotate on a single axis with minimal friction or interference, but not rotate in any other direction, (2) The MOE should stay substantially in the same location and in proximity to the neighboring MOEs, and (3) The MOE(s) should optically cover 70% or more of the space they rotate in when they are in their two bi-stable optical states such that the two sides of the MOE(s) can have different optical coatings (colors) that are viewed when the MOEs are rotated.

Cylindrical MOEs, when placed side by side and under the influence of an external magnetic field, can form a switchable, addressable, writeable, bi-stable display element where substantially zero power is required to retain the image of the individual pixel or display. This bi-stable nature is enabled by restricting rotation of these MOEs to a single axis. Combining the constrained rotation with the presence of neighboring MOEs creates a disposition for all MOEs in a single pixel to align their poles North to South or South to North in order to lower their overall potential energy. These two orientations of North to South and South to North correspond to the two bi-stable optical (color) states of the pixel.

In one embodiment of the present invention, a cylindrical or near cylindrical shaped magneto optical element (MOE) is magnetized such that the North-South magnetization axis bisects two colors of this element. Here, it is important to note that this MOE will respond to an external magnetic field by rotating approximately 180 degrees along its long axis, and thus switch color. These MOEs can be of virtually any size, but in one embodiment are more preferably between 0.3 and 3 millimeters in diameter and have an aspect ratio of between 1/1 and 1/50. The larger diameter MOEs can be lower cost to manufacture and well suited to very large size displays (9 mm pixel size and larger), but they may limit resolution and use more material and require more power to actuate. Smaller MOEs have the benefit of higher resolutions, faster response times and lower material usage. But they may require higher precision manufacturing and thus higher cost processes. Also, decreasing the pixel size increases the number of pixels in a given area of display and thus requires more electronics. For low cost applications or very large size displays, larger pixels can be a cost benefit and can utilize simpler and more cost effective electronics and manufacturing. It is envisioned that MOEs can be manufactured down to 0.1 mm diameter using existing magnetic materials and industrial processes.

In another embodiment of the present invention, one or more MOEs can be used to produce a display device. In addition, with more than one MOE placed side by side, in this embodiment, the North and South poles of these MOEs will tend to self align (magnetic attractive force) together to lower their potential energy without the need for an external magnetic field. In doing so, due to the orientation of the magnetic pole axis that corresponds to the colored sides of the MOEs, a bi-stable pixel, display or imaging element is formed. It is important to note here, that the correct orientation of the North-South Poles of the MOEs corresponding to the two colors is important. For example, if the orientation of the plane of color separation is perpendicular to the axis of the MOEs magnetic poles (similar to prior art approaches to magnetic displays), the low-energy, bistable state of the MOEs would result in both colors being viewable by the observer, whereby an undesirable mixed-color, "gray" image would result.

In one embodiment, an array of MOEs is used whereby their rotation is restricted to one axis of rotation. Here, the MOEs themselves are constrained to rotate only along their long axis or axis of rotation, not end-over-end. This allows for the use of one or more MOEs to be utilized as a reliable pixel or display element which can be coupled with an external magnetic write head or backplane, electronically addressable where a clear front plane is also used to contain the MOEs. Here, if an array of MOEs is used, discrete groups of MOEs can be addressed individually as pixels resulting in the generation of an electronically or electromagnetically writeable image by means of individual display segments or pixels which contain one or more MOEs.

A preferred method to constrain the MOEs rotation is accomplished by placing the MOEs (2 or more) side by side in a cavity of slightly larger size then the MOEs they contain. The MOEs loosely "fill" the cavity in a way that they are still free to rotate and self align. There is no need for any type of hinge, or other mechanical attachment between the MOEs and the display. This enables low cost manufacturing of large pixel arrays because an array of pixel cavities is simply "filled" with the MOEs and then a clear front plate is used to contain the MOEs into the array and permit viewing from the front.

In another preferred embodiment, individual MOEs or groups of MOEs can be separated from one another by physical means. Magnetic field strength decreases exponentially with distance. Therefore, the magnetic interaction between MOEs dramatically decreases as the MOEs are separated by any distance from one another. This architecture is advantageous in that it significantly reduces magnetic "cross-talk" between MOEs or groups of MOEs so the display can be reliably written on a pixel by pixel basis. The simplest method is to have separation walls between pixels of sufficient thickness to decrease the magnetic interaction between pixels as needed. This separation wall should be of a slightly higher profile then the MOEs it encases. Thus the wall can also be used to create the cavity needed to constrain the motion of the MOEs yet permit free rotation and interaction of MOEs within a single pixel.

In further embodiments of the invention, the physical wall separating the single or groups of MOEs can be a magnetic shielding material such as Iron, Nickel, Cobalt or any alloy of the same. It will be obvious to anyone knowledgeable in the state of the art after reading this description that a variety of materials or material composites can be used to limit or enhance the magnetic field based on this architecture and these materials variations are considered to be within the scope of this invention. By the use of a magnetic shielding material in the walls between pixels it is possible to further inhibit crosstalk between pixels using a much thinner wall then might be required if relying on distance alone as the magnetic separator. Thinner walls are desirable because the walls do not change optical state and thus can reduce the contrast of the resulting display.

Another embodiment of the current invention relates to the relative magnetic field strength of neighboring MOEs within a pixel or display architecture. The magnetic attraction between MOEs is beneficial when it assists in self aligning the MOEs within a pixel to one of the two bi-stable optical states. However, the MOE to MOE attractive force must be overcome by the external magnetic field used to "write" the pixel to a new state by rotating the MOEs to the new, 180 degree opposed bi-stable state. When two or more MOEs are used per pixel, a method of improving the relative performance of the external magnetic field is accomplished by alternating the magnetic field strength of neighboring MOEs within the pixel. The stronger MOEs herein are called "drivers" and the weaker MOEs are called "passengers".

To illustrate the benefit of this embodiment, a comparison will be made between a pixel where all 3 MOEs in a pixel have the same magnetic strength and a similar 3 MOE pixel with a passenger, driver, and passenger architecture. In the pixel configured as passenger, driver, and passenger, the center driver MOE will have increased magnetic strength (4× increase for this example). The other two passenger MOEs placed at either side of the driver will have a decreased magnetic strength (0.25× for this example). In both of these three-MOE pixel designs, the attractive force between neighboring MOEs will be identical so the self alignment ability of the MOEs in the two pixel designs is identical. For the passenger, driver, and passenger design, the attractive force equals 1× (0.25× passenger times 4× driver). For the pixel with all 3 MOEs having the same magnetic strength the MOE to MOE attractive force is also 1× (1× MOE times 1× MOE). However, when an external magnetic field is applied the rotational force is very different between the two pixel architectures. Assuming an external magnetic field of 2× is applied, the rotary force on the Driver MOEs is 8× (4× driver times 2× external field). For the pixel with all 3 MOEs at 1×, the external field creates a 4 times less rotary force then the other design of only 2× (1× MOE times 2× external field).

Accordingly, alternating magnetic field strength of MOEs within a pixel can be used to preserve the same self aligning MOE to MOE force and at the same time significantly increase the rotary force and therefore efficiency of the external magnetic field used to write the pixel. In some embodiments, it is anticipated that the field strength of driver MOEs will be limited by materials to a field strength 400 milliTesla or less. The field strength of passengers in this embodiment would then be reduced to 10 milliTesla or less. For embodiments of displays where all MOEs have the same field strength, it is anticipated they will use a field strength of 40 milliTeslas or less. This method can be used with MOE pixels containing any number of MOEs where the magnetic field strength of MOEs is changed neighbor to neighbor.

Another embodiment of this invention is the use of passenger, driver pixel architectures to reduce crosstalk between pixels in a display. In pixel designs where 3 or more MOEs are used and where the outside MOEs that make contact to neighboring pixels are passengers with reduced magnetic field strength, there is a significant decrease in crosstalk between pixels. This is because the passenger MOEs of two neighboring pixels are in contact with each other. Because passenger MOEs have reduced magnetic strength (in our example 0.25×), there attractive force of passenger MOE to the neighboring pixels passenger MOE is only 0.0625× (0.25× times 0.25×). At the same time, the attraction of the passenger MOE to the neighboring driver MOE inside the same pixel is strong. In this example it would be 1× (0.25× times 4.0×). Thus a passenger, driver architecture can be used to virtually eliminate crosstalk without the need for separation walls or shielding between pixels.

Figure 1:
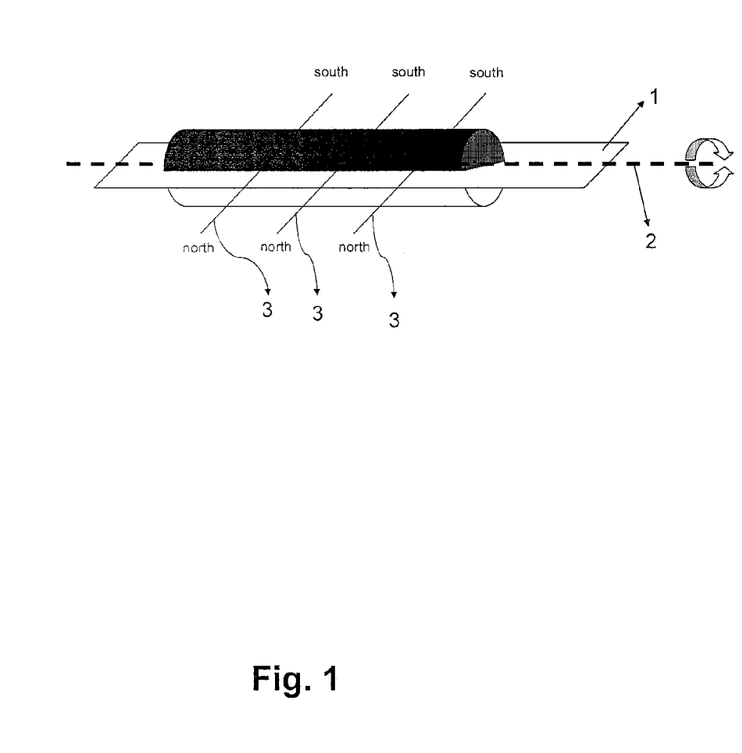
FIG. 1 represents a schematic of an individual MOE illustrating axis of rotation, color separation plane and MOE magnetic dipoles.

Referring to FIG. 1, a specific embodiment of Magneto-Optical Elements (MOES) is illustrated. In this embodiment, the MOEs are cylindrical like shapes, or more complex shapes with similar functionality as the cylindrical shaped magnetic elements, having colored or other optical coatings on at least two sides such that they can be rotated to appear to a viewer as either one of the two optical states.

FIG. 1 further illustrates that the MOEs of the present embodiment include a plane of color separation, denoted at 1, an axis of MOE rotation denoted at 2 and MOE magnetic dipoles denoted at 3. As is shown in the figures, the MOE magnetic dipoles 3 run in parallel with the plane of color separation 1 and are perpendicular to the axis of MOE rotation 2.

As further illustrated in FIG. 1, the north and south poles of the magneto optical element bisect the two colors of the MOEs. In other words, the MOE of FIG. 1 has a first optical layer or portion with a first color and a second optical portion layer or portion with the plane of the color separation parallel to its North-South magnetic field dipole. Note that in the specification and in the claims, a "color" can consist of, but is not limited to, a colorant (typically occurs by the addition or use of traditional paints, pigments, dyes or the like), a reflective medium (like use of a mirror or the like) or a phosphorescent, fluorescent or luminescent medium (for example by the addition of phosphors).

In this embodiment, the MOEs have a permanent magnetic field that is aligned to the optical surfaces on the particle as shown. The MOEs respond to an external magnetic field by rotating in response to the external field. It is important to note that the mass of the MOEs is an important design factor because the less mass the MOEs have, the less energy is typically needed to rotate them and the less friction they will create.

Another important design factor is the ability to control the magnetic strength of the MOEs. If the magnetic field strength of the MOEs is too low, actuation by an external field becomes increasingly difficult. If the MOEs have too strong of a magnetic field, they can create a strong interfering bond between particles that must be overcome by the external magnetic field to actuate the MOEs. It should be noted that there are a variety of complex shapes and cavities that can have the required functionality to make effective MOEs. The key functions of MOEs in the present embodiment are low friction rotation that is restricted to one axis, the ability to stay primarily in one location in proximity to neighboring MOE(s)

and optical surfaces (usually colored) on either side that cover >70% of the area that the MOE occupies in a front plane when viewed in the two bi-stable states. These MOE shapes can include, but are not limited to, solid or near solid cylinders, fibers or rods, hollow tubes, dumbbell or I-beam shapes, "football" shapes, etc. that could be developed by someone skilled in the art and these variations in shape are also within the scope of this invention.

Figure 2:
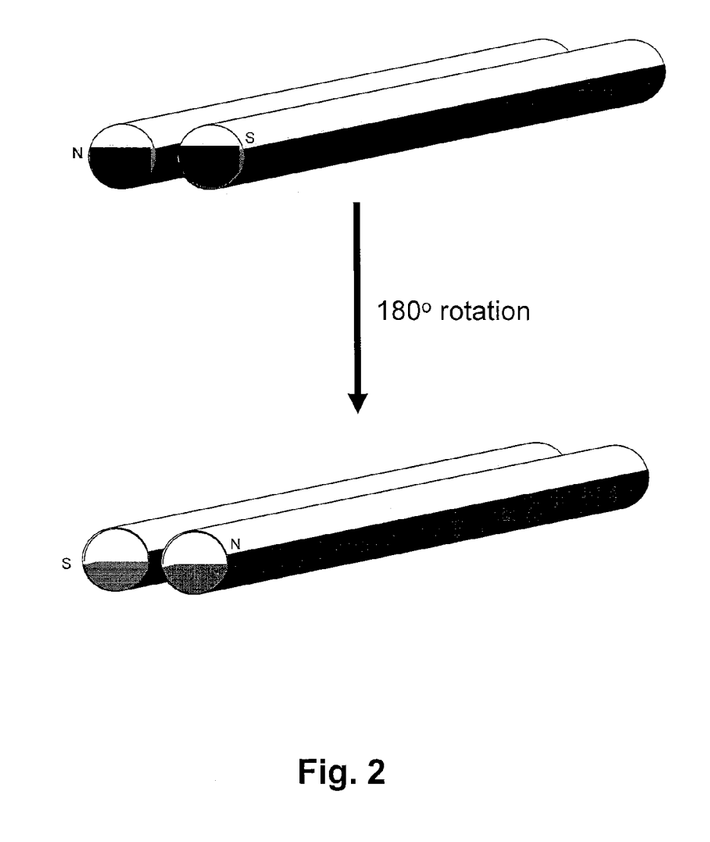
FIG. 2 illustrates a schematic representation of two two-color MOEs with cylindrical shape and North-South poles parallel to the plane of color separation and perpendicular to the axis of rotation, showing color change due to 180 degree rotation.

Referring now to FIG. 2, an array of MOEs, where each MOE is constrained so that rotation is limited to only one axis of motion, is an embodiment of the present invention. As illustrated, the constrained axis of rotation is consistent for all MOEs in each optical segment of the display. It is possible, but not required, to have all optical segments of the display contain MOEs that are in parallel with each other. As shown in FIG. 2, the north-south magnetic field within the MOEs is parallel to the two color planes. More conventional spherical magnetic particles can rotate in any direction. By configuring the MOEs in the present invention so that they can only rotate in one direction or about one axis (in this embodiment by making them cylindrical), there are significant advantages. The MOEs color state can now be controlled when the MOEs are magnetized parallel to the plane bisecting the two color layers. Even if spherical particles were magnetized in this parallel configuration they would be free to rotate around their magnetic poles and the two color states would not be predictable. In a near cylindrical type of MOEs, the MOEs are attracted to one another in a north-south orientation along their entire axis, unlike spheres where single point contacts allow them to tumble and rotate freely even at their low energy state, which is undesirable.

Again referring to FIG. 2, if two or more MOEs are placed in intimate contact they will align their magnetic fields into one of two low energy states, both of which can be accessed by means of 180 degrees of rotation. These are North-South, North-South or South-North, South-North. The magnetic field strength of the MOEs is designed so that the rotational force created by the magnetic attraction of neighboring MOEs within a pixel is greater then the mechanical frictional force working to keep the MOEs stationary. In this configuration the MOEs will always align parallel to each other in one of these two stable states. Because the color layers or planes are parallel to the poles of each MOE, this results in two stable color states. No power is needed to maintain these self aligning bistable color states.

This embodiment also eliminates the problem created by curved magnetic flux patterns from an external magnetic source rotating the MOE particles only partially, thus creating a "fountain head" pattern typically generated by an external magnetic field. Even after being "written" by an external magnetic source by means of a "fountain head" magnetic field pattern, the MOEs will then self align to the nearest parallel bistable state once the external magnetic force is removed. In this way the external field only needs to initiate rotation past the 90 degrees of completion and the MOEs own attractive force will complete the alignment process into the new optical state.

Another embodiment of the invention eliminates the effects that one pixel has on adjacent pixels. Each pixel of a two dimensional array, where in one embodiment each pixel includes two or more MOEs, is separated from the other pixels of the array. This separation, specific separation methods of which have previously been explained or will be explained in more detail to follow, allows the pixels to have a magnetic domain independent of any other pixel. In other words, the MOEs of each pixel may self align to one of the bistable states without regard to the actions of the other pixels.

Figure 3A:
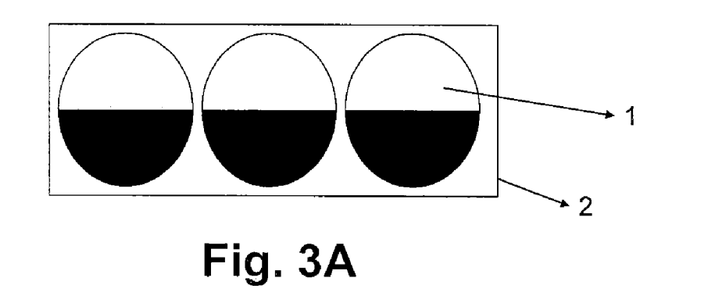
FIGS. 3A, 3B and 3C illustrate a schematic cross-section representation of more than one MOEs having a restrained rotation about one axis since they are in a constrained space.
Figure 3B:
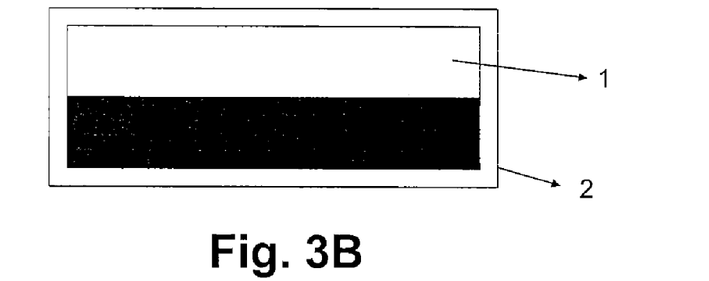
Figure 3C:
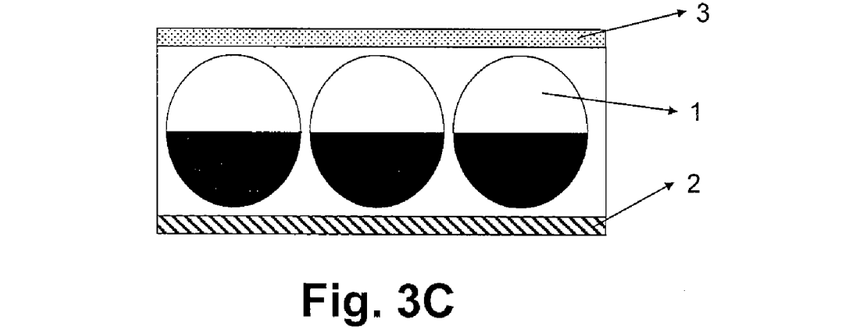

In addition, the MOEs of each pixel may rotate when subjected to an external magnetic field or force without affecting the other pixels. This allows each pixel to have an electronically or electromagnetically writeable image written to independently of the other pixels Referring now to FIGS. 3A and 3B, is it shown that the MOEs, designated at 1, have a restrained rotation about one axis since they are in a constrained space, designated at 2, a rectangular space in this example. FIG. 3B shows a side view of the MOEs 1 and constrained space 2 while FIG. 3C shows another side view showing the display backplane 2 and front face plate 3 acting as part of the constraining space.

Figure 4A:
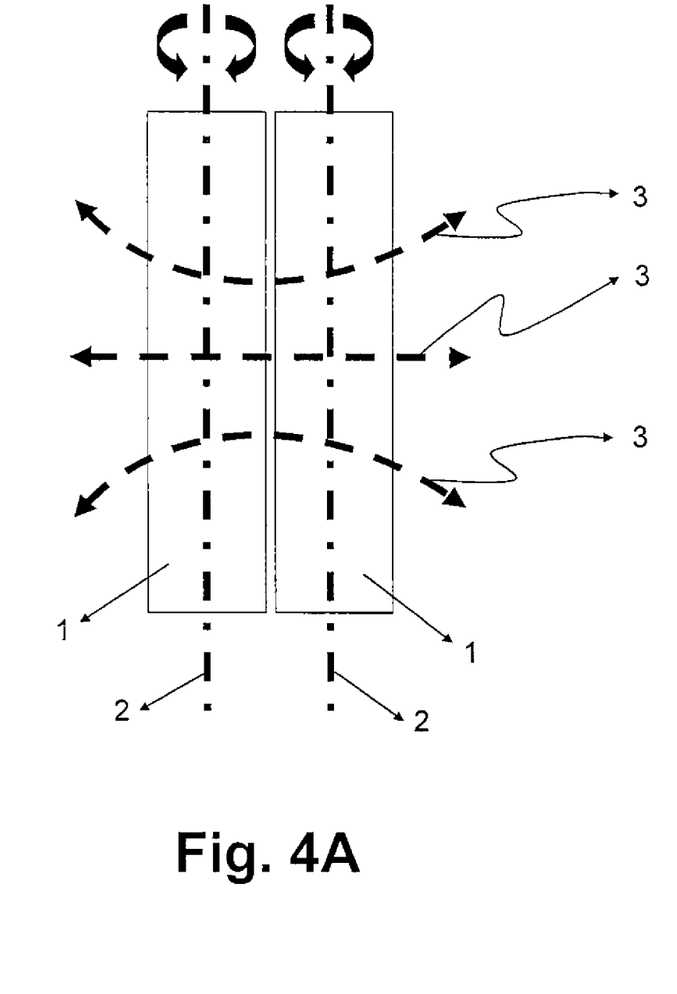
FIGS. 4A and 4B illustrate a magnetic field applied to more than one MOE to cause rotation of the MOEs.

Turning now to FIG. 4A, a top view of a magnetic field applied to a display of the present invention is illustrated. As is shown, because the magnetic poles or flux lines of the external magnetic field, designated at 3, generated by the display backplane or some other magnetic head or external field are configured perpendicular to the axis of rotation of the MOEs, designated at 2, the MOEs themselves, designated at 1, will respond by rotation to this externally applied magnetic field 3.

Figure 4B:
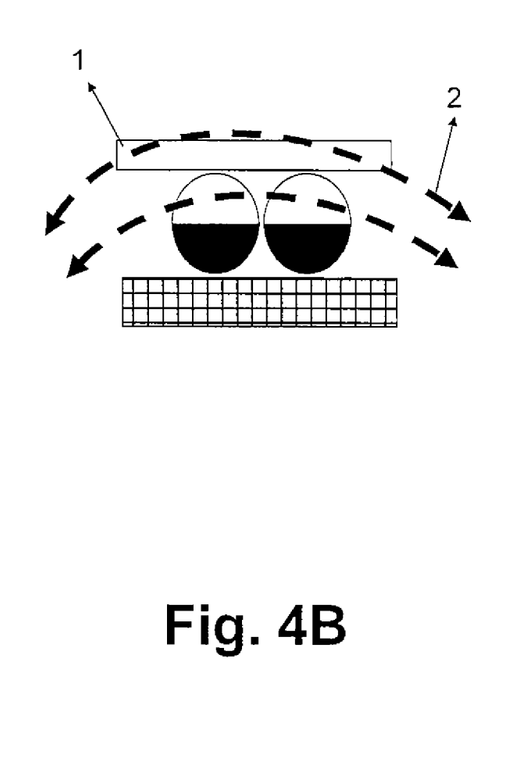

Referring to FIG. 4B, a side view of an external magnetic field, designated at 2, is parallel to the display's viewing plane, designated at 1. The MOEs can be actuated with this applied magnetic field that is parallel to the surface of the display rather then a magnetic field that is projecting out perpendicular to the display like more conventional, spherical electromagnetic display approaches that have previously been envisioned.

Figure 5:
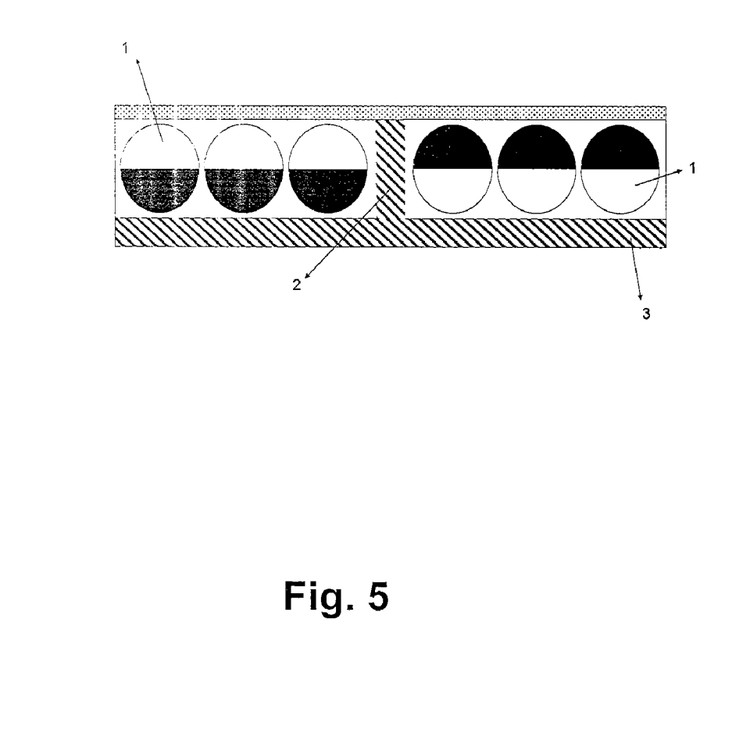
FIG. 5 illustrates a schematic cross-section representation of more than one MOEs in a display architecture with a physical separator between groups of MOEs or pixels.

FIG. 5 represents a preferred embodiment of the present invention wherein a MOE or group of MOEs designated at 1, typically a group of MOEs that make up an individual pixel, are separated by physical means, typically a solid structure designated at 2. This separation means may or may not be a physical part of the backplane or magnetic write head, designated at 3. This separation of the MOEs results in increased distance between neighboring MOE pixels and reduces crosstalk or electromagnetic interference between the individual pixels. In addition, the separation material can also be a material that can act as a magnetic shield such as Iron, Nickel or Cobalt or an alloy thereof. Such materials are well known in the art as being magnetic shielding materials.

Figure 6:
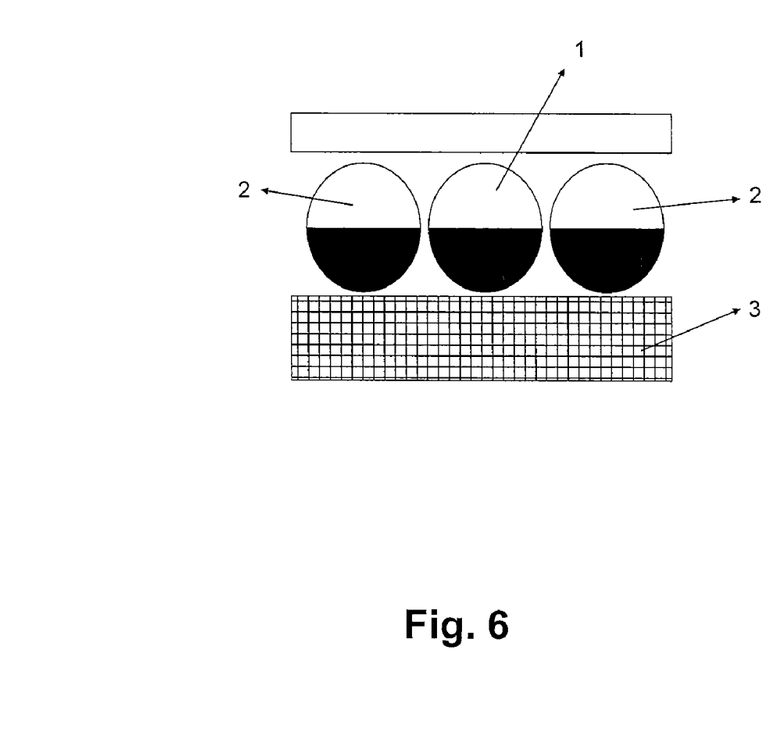
FIG. 6 illustrates a schematic cross-section representation of a group of three MOEs with different magnetic field strengths between the center MOE and the outside MOEs.

Referring to FIG. 6, by changing the magnetic field strength of individual MOEs within the display or pixel, improvements in efficiency and decreased cross talk can be achieved. As shown in FIG. 6, the magnetic strength of the center MOE, designated at 1 and also called the driver, can be increased so it is greater then the magnetic field strength of the two outside MOEs, designated at 2 and also called the passengers. When the magnetic field strength of the driver MOE 1 is increased, the magnetic field strength of the passenger MOEs 2 must be decreased by the same factor if the same attractive force between MOEs is desired. This creates two significant benefits. First, the driver MOE 1 will respond with greater force (by means of rotation) to the external magnetic field applied by the backplane, designated at 3, or some other magnetic field source. As previously discussed, if all three MOEs have the increased magnetic loading of the driver MOE 1, then they would be strongly attracted to each other and the external coil would have to have an increased power to compete with the neighboring MOEs. Advantageously, the driver-passenger configuration of the present invention increases the response of the driver to an external coil (magnetic field) while decreasing the MOE to MOE to MOE interaction which the Driver MOE and backplane magnetic strength must overcome to allow for MOE rotation. Additionally, the driver MOE 1 in the center can be controlled with a smaller external magnetic field which means a smaller external electromagnet or backplane or magnetic write head can be used and/or less current used to drive this backplane. Once this external magnetic field is turned off, the two passenger MOEs 2 will immediately align to the center driver MOE 1. In addition, this principle of alternating MOE field strength can be extended to larger pixel sizes where more then three MOEs are contained within a single pixel. This passenger-driver-passenger interaction and the driver to external magnetic field can be quantified by means of the following equations:

$$\text{Driver magnetic attraction to passenger MOEs on either side} = D*P1 + D*P2$$

$$\text{Driver response to an external magnetic field} = D*Ex$$

Where; D=magnetic field strength of driver
P1=magnetic field strength of passenger 1
P2=magnetic field strength of passenger 2
Ex=magnetic field strength of external field Another benefit of the embodiment of FIG. 6 is that crosstalk between pixels can be reduced when the outside passenger MOEs 2 of the pixel have reduced field strength. The attractive force between two weak MOEs will be far less then the attractive force between two strong MOEs or one strong MOE and one week MOE. By designing the pixel so stronger MOEs are in the middle and weak MOEs are at the edge of each pixel, a stable state is created between pixels that prevents crosstalk. The outside weaker MOEs have a stronger attraction to the stronger MOEs neighbor within the same pixel however, the weak to weak attraction of the edge MOEs between adjacent pixels is not sufficient and crosstalk is eliminated.

Another method of eliminating crosstalk is to alternate the orientation of the MOEs of neighboring pixels to create a checkerboard pattern. In this way the dominant magnetic field and axis of rotation of adjacent pixels are always perpendicular to their neighboring pixels. This prevents the external magnetic field used to rotate a pixel from affecting the immediate neighboring MOEs because their orientation is 90 degrees rotated so no rotary force is created in the axis of rotation in the MOEs of neighboring pixels.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A magnetic display element comprising:
a first optical portion having a first color;
a second optical portion having a second color, wherein the first and second optical portions bisect along a plane of color separation; and
wherein the magnetic display element is magnetized such that a North-South dipole of the display element is coplanar the plane of color separation and perpendicular to an axis of rotation of the display element.

2. The display element in accordance with claim 1, wherein the magnetic display element is cylindrical to near cylindrical in shape.

3. The magnetic display element in accordance with claim 1, wherein the magnetic display element is between 0.3 and 3 millimeters in diameter and has an aspect ratio of between 1/1 to 1/50.

4. The magnetic display element in accordance with claim 1, wherein the magnetic display element is configured to only rotate about a single axis of rotation when exposed to an external magnetic field.

5. The magnetic display element in accordance with claim 1, wherein the magnetic display element is configured such that the first color is viewable when in a first orientation and wherein the display element rotates approximately 180 degrees to a second orientation when exposed to an external magnetic field such that that the second color is viewable, the magnetic display element being further configured to require substantially zero power to remain in the first or second orientation when no external magnetic field is applied.

6. The magnetic display element in accordance with claim 1, wherein the magnetic display element is a first magnetic display element and is configured to self-align with a second magnetic display element placed proximate the first magnetic display element such that the first and second magnetic display elements will automatically self-align their poles into a first bistable state of North to South or a second bistable state of South to North and wherein the first and second display elements will remain in the first or second bistable state in the absence of being subjected to an external magnetic field.

7. A display device configured to display one or more magnetic elements comprising:
a one or two dimensional array of pixels, wherein one or more magnetic elements comprise each individual pixel of the array of pixels;
a plurality of cavities configured to hold at least one pixel;
wherein each pixel is separated from other the pixels of the display such that each pixel comprises an magnetic domain that is independent from the magnetic domain of any other pixel;
wherein the independent magnetic domain of each pixel allows the one or more magnetic elements comprising each individual pixel to self-align in a first or second bistable state and to remain in the first or second bistable state in the absence of an outside magnetic force regardless of the actions of other pixels of the array;
wherein the independent magnetic domain of each pixel allows the two or more magnetic elements comprising each individual pixel to rotate from the first bistable state to the second bistable state or from the second bistable state to the first bistable state when subjected to an outside magnetic force without affecting the orientation of the other pixels of the array; and
wherein at least one of the one or more of the magnetic elements comprises:
a first optical portion having a first color;
a second optical portion having a second color, wherein the first and second optical portions bisect along a plane of color separation; and
wherein said at least one magnetic element is magnetized such that a North-South dipole of said at least one magnetic element is coplanar the plane of color separation and perpendicular to an axis of rotation of said at least one magnetic element.

8. The display device in accordance with claim 7, wherein shape of the one or more cavities and/or the shape of the magnetic elements at least partially limit the movement of the magnetic elements to a single axis of rotation.

9. The display device in accordance with claim 7, wherein an external magnetic field is produced by a backplane or write head of the display and is configured such that the external magnetic is perpendicular to the axis of rotation such that the one or more magnetic elements of the pixels respond to the perpendicular magnetic field and rotate about the axis of rotation.

10. The display device in accordance with claim 7, wherein the external magnetic field is configured parallel to the viewing plane of the display.

11. The display device in accordance with claim 7, wherein each pixel is separated into an independent magnetic domain by physical means placed between the pixels.

12. The display device in accordance with claim 7, wherein each pixel is separated into an independent magnetic domain by configuring the two or more magnetic elements to alternate between a higher magnetic field strength and a lower magnetic field strength, with elements of lower magnetic field strength being on each end of the pixel.

13. The display device in accordance with claim 7, wherein each pixel is separated into an independent magnetic domain by magnetic shield material.

14. The display device in accordance with claim 7, wherein each pixel is separated into an independent magnetic domain by alternating the orientation of the magnetic elements of neighboring pixels to create a checkerboard pattern such that a dominant magnetic field and the axis of rotation of adjacent pixels are perpendicular to their neighboring pixels.

15. The display device in accordance with claim 7, wherein the first bistable state is North to South and the second bistable state is South to North.

16. A display device configured to display one or more Magneto-Optical Elements (MOEs) comprising:
  a first plurality of MOEs having a first magnetic field strength and being configured in a first orientation;
  a second plurality of MOEs having a second magnetic field strength that is less than the first magnetic field strength and being configured in the first orientation, wherein the first and second plurality of MOEs are configured such that individual MOEs of the second plurality of MOEs are placed beside individual MOEs of the first plurality of MOEs in an alternating arrangement;
  wherein the first plurality of MOEs rotate to a second orientation in response to an external magnetic field;
  wherein the second plurality of MOEs rotate to the second orientation in response to the rotation of the first plurality of MOEs: and
  wherein at least one of the MOEs comprises:
    a first optical portion having a first color;
    a second optical portion having a second color, wherein the first and second optical portions bisect along a plane of color separation; and
    wherein said at least one MOE is magnetized such that a North-South dipole of said at least one MOE is coplanar the plane of color separation and perpendicular to an axis of rotation of said at least one MOE.

17. The display device in accordance with claim 16, wherein the second magnetic field strength of the second plurality of MOEs is at least 20% lower than the average field strength of the first magnetic field strength of the first plurality of MOEs.

18. The display device in accordance with claim 16, wherein configuring the second magnetic field strength to be less than the first magnetic field strength at least partially prevents unwanted magnetic interaction between the first plurality of MOEs and the second plurality of MOEs.

19. The display device in accordance with claim 16, wherein the first plurality of MOEs and the second plurality of MOEs are configured as a first pixel of the display and a third plurality of MOEs and a fourth plurality of MOEs are configured as a second pixel of the display that is proximate the first pixel, the third plurality of MOEs having a magnetic field strength larger than the magnetic field strength of the fourth plurality of MOEs, wherein placing an individual MOE of the second plurality of MOEs closest the second pixel and placing an individual MOE of the fourth plurality of MOEs closest the first pixel at least partially reduces unwanted cross-talk between the first and second pixels of the display.

* * * * *